J. POWERS.
REPEAT PERFORATING MECHANISM.
APPLICATION FILED JAN. 28, 1916.

1,242,721.

Patented Oct. 9, 1917.
7 SHEETS—SHEET 1.

Witnesses:

Inventor.
James Powers.
By his Atty,

UNITED STATES PATENT OFFICE.

JAMES POWERS, OF NEW YORK, N. Y., ASSIGNOR TO POWERS ACCOUNTING MACHINE COMPANY, OF NEW YORK, N. Y., A CORPORATION OF DELAWARE.

REPEAT PERFORATING MECHANISM.

1,242,721.  Specification of Letters Patent.  Patented Oct. 9, 1917.

Application filed January 28, 1916. Serial No. 74,796.

*To all whom it may concern:*

Be it known that I, JAMES POWERS, a citizen of the United States, residing in New York, in the county of New York and State of New York, have invented certain new and useful Improvements in Repeat Perforating Mechanism, of which the following is a specification.

This invention relates to perforators generally and more especially to power-operated perforators initiated by depression of a pedal.

One of the main objects of the present invention is to provide perforators whereby a record may be set for taking a perforation and whereby one or more cards may be perforated by the same record before the setting is restored.

Another object of the invention is to provide means whereby one or more cards are perforated from one record and the several cards discharged into different receptacles and thus accommodate an arrangement in which original cards are collected in one receptacle and duplicate cards in another.

Still another object of the invention is to provide a perforator which can be set either to perforate one card with each record or to perforate more than one card with a single record.

These and other features, capabilities and advantages of the invention will appear from the subjoined detailed description of specific embodiments thereof illustrated in the accompanying drawings in which—

In the embodiment shown in Figs. 1 to 6 inclusive, there is provided a main frame 11 in the lower portion of which the motor 12 is mounted and connected by shaft 13, worm 14, worm wheel 15, sprocket wheel 16 and chain 17 with the main driving wheel 18 which is loosely mounted on the shaft 19.

On the shaft 19 are mounted the cam 20 for actuating the picker plate 21, gear 22 for actuating the feed rolls 23, and cam 24 for actuating the pin box raising lever 25.

Figures 1, 9:
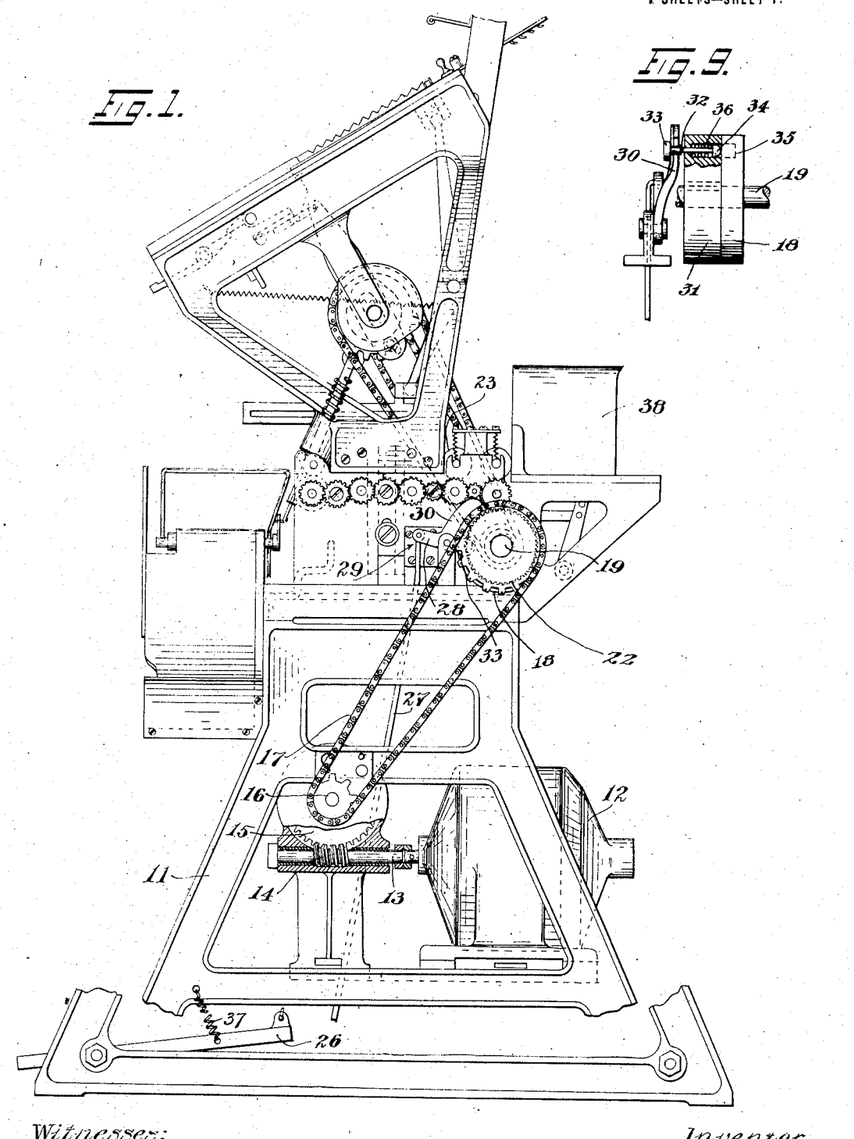
Figure 1 is an elevation of one side of a perforator made in accordance with one embodiment of the invention.
Fig. 9 is a detail of the means for connecting the driving means with the drive shaft.
Figure 2:
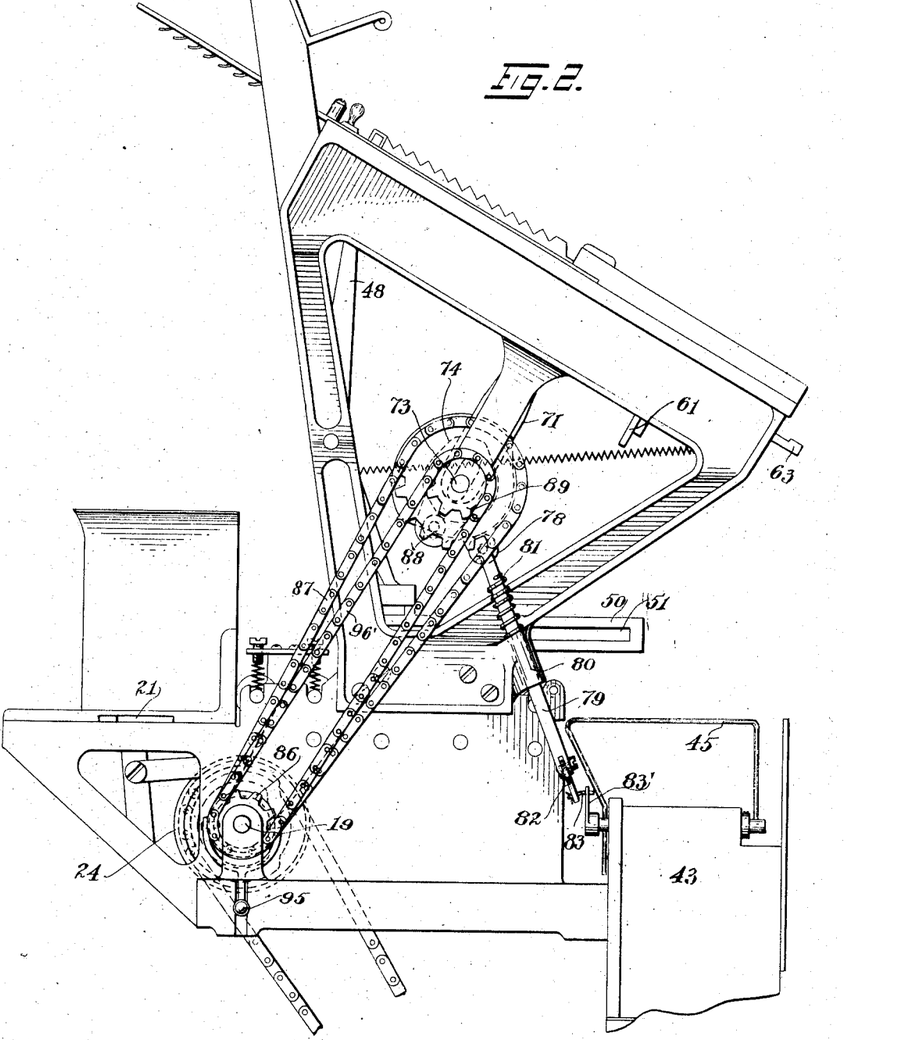
Fig. 2 is an enlarged elevation of the upper part of the perforator illustrated in Fig. 1 and showing the side opposite to that shown in Fig. 1.
Figure 3:
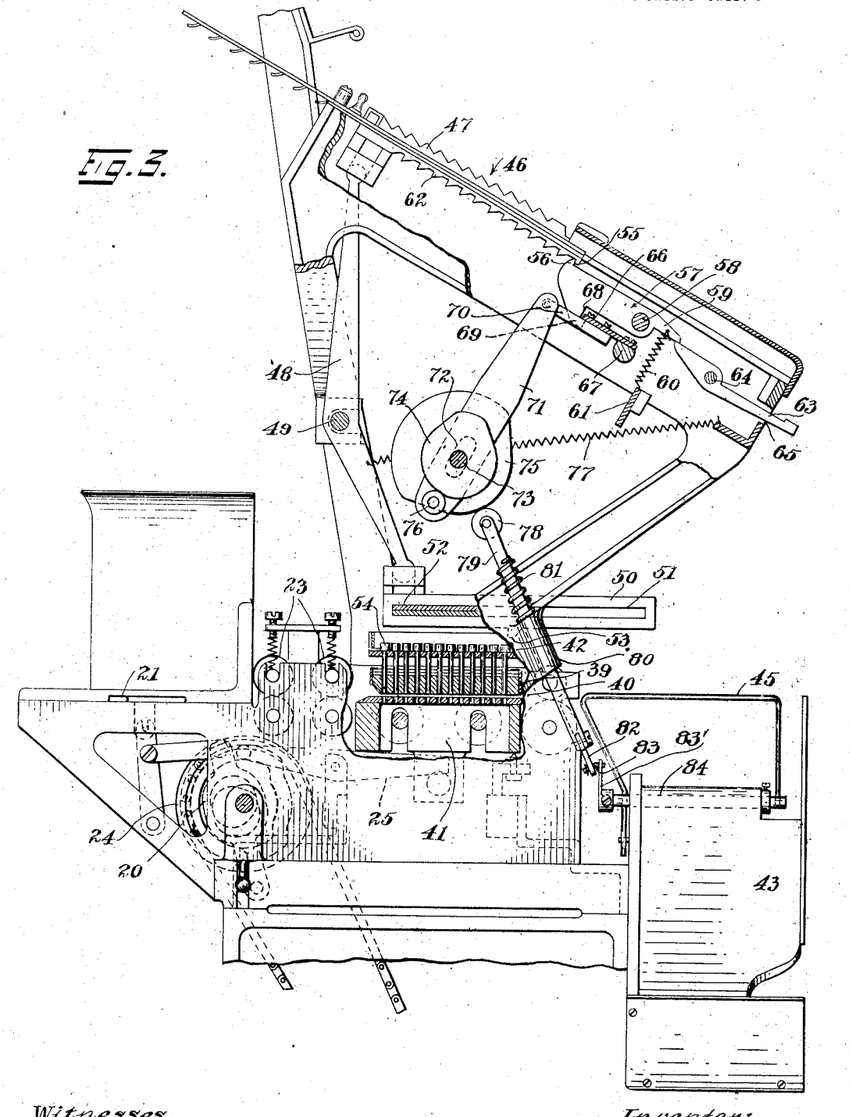
Fig. 3 is an enlarged fragmental elevation similar to that shown in Fig. 2, with parts shown in section.
Figure 4:
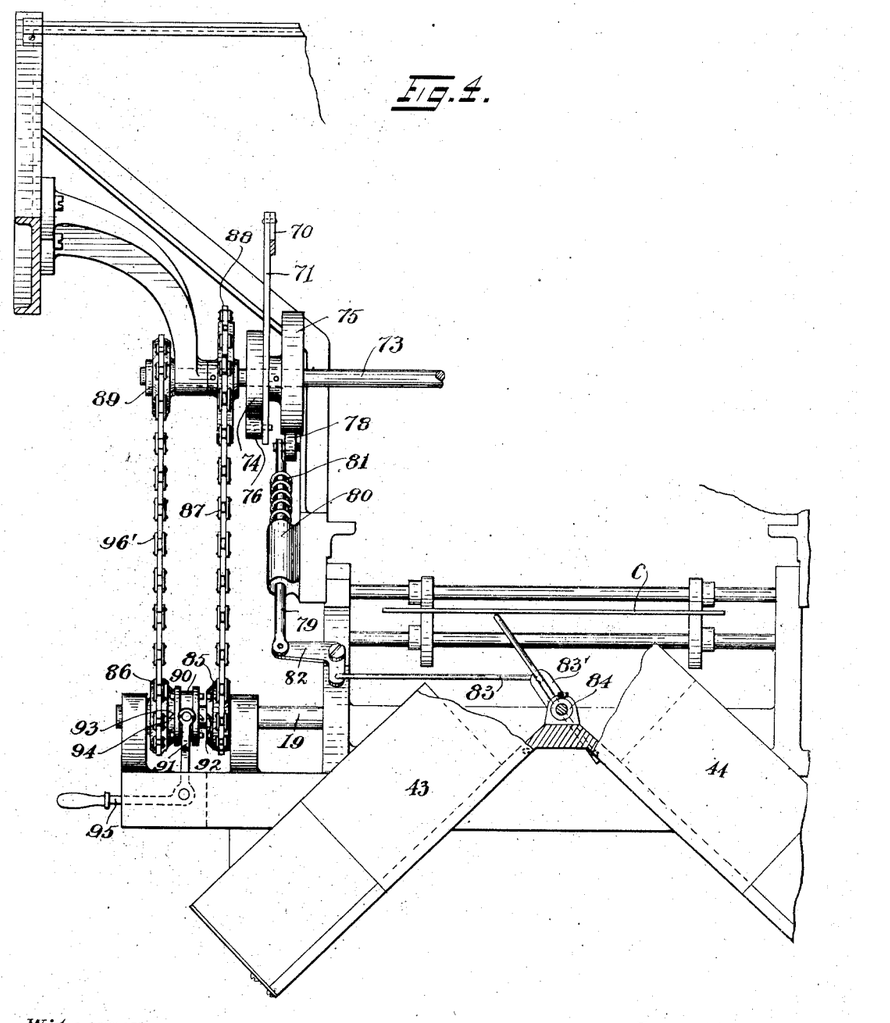
Fig. 4 is a fragmental front elevation on the scale of Fig. 2 particularly showing the card discharge controlling means of the embodiment illustrated in Fig. 1.
Figure 5:
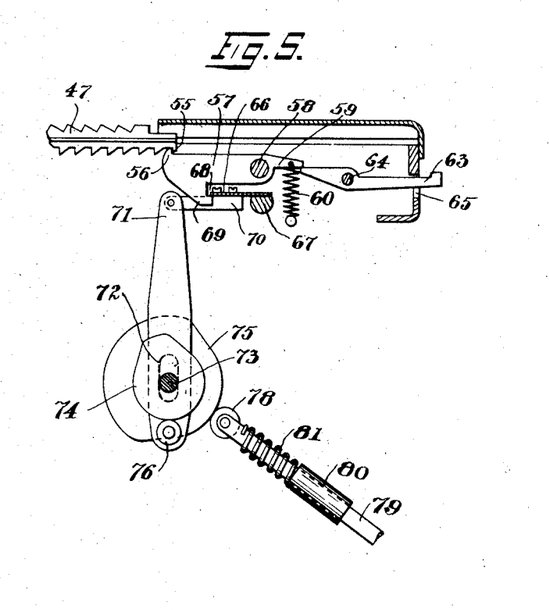
Fig. 5 is a detail view of the connecting means for anchoring the keys for a setting of the embodiment illustrated in Fig. 1.
Figure 6:
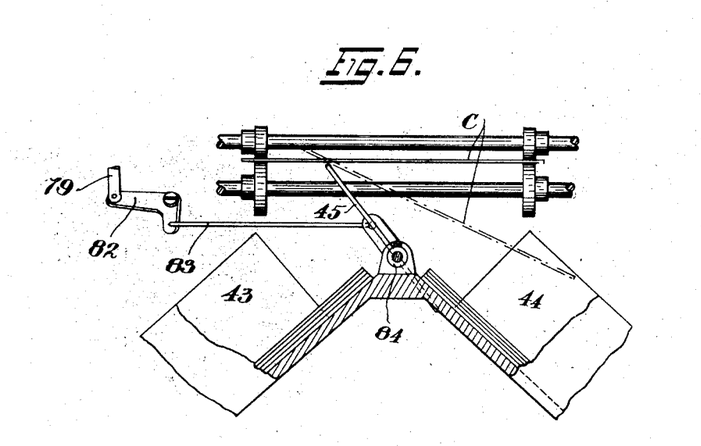
Fig. 6 is a detail view further illustrating the card discharge controlling means illustrated in Fig. 4.

The shaft 19 on which the aforesaid actuating means are mounted will remain inactive until connected to the driving wheel 18 by means which comprises essentially the pedal 26 pivoted at one end to the lower end of the frame 11, and at its other end to a link 27 which is pivotally connected to the forwardly extending arm 28 of a cam lever 29, the other arm 30 of such cam lever 29 being bent laterally and disposed to travel in a path adjacent to the clutch wheel 31 fixed on the shaft 19 adjacent to the driving wheel 18, the wheel 31 having mounted thereon a pin 32 having a head 33 disposed on the side adjacent to the arm 30 and an active end 34 adapted to extend through to the other side into engagement with a recess 35 formed in the wheel 19. The pin 32 is provided with a spring 36 for normally maintaining its active end 34 protruded to be engaged by the recess 35 when the driving wheel 18 is actuated. By means of the spring 37, the cam lever 30 is normally maintained in operative relation to the path of movement of the head 33. The operation is as follows: Assuming that the drive wheel 18 is being actuated and the pedal 26 is depressed so that the arm 30 is removed out of the path of movement of the head 33, the active end 34 of the pin 32 will be extended and as soon as the recess 35 registers with the same, the spring 36 will snap the active end 34 into such recess 35 whereupon the wheel 31 will be rotated with the wheel 18 and consequently the shaft 19 with the actuating elements fixed thereon. When the pedal 26 is released the spring 37 will retract the arm 30 into the path of movement where the head 33 of the pin 32 will ride up on the arm 30, and on account of the incline, withdraw the pin 32 and therewith the active end 34 out of engagement with the recess 35 and release the wheel 31 upon engagement with the wheel 18.

At the rear of the frame 11 above the shaft 19, the hopper 38 is disposed in which the cards to be fed into the machine are placed, and at the bottom of which coöperates the picker plate 21 to feed the cards one at a time to the feed rollers 23 by which the cards are fed between the perforated plates 39 and 40 which form part of the pin box 41 which is suitably mounted in guideways and connected by the lever 25 to be vertically reciprocated thereby. In the perforations of the plate 39, the pins 42 are mounted. While disposed between the plates 39 and 40, the cards are perforated and thereafter discharged either to the card receptacle 43 or 44 according to the setting of the deflector 45.

For setting the pin 42 for perforation, an arrangement is used, in which an inclined keyboard 46 is provided having a plurality of slide bars 47 slidably mounted thereon and connected, by the levers 48 on the shaft 49 mounted on the frame 11, with the setting bars 50 which are provided with slots 51 through which the guide plate 52 extends. The lower edges of the setting bars 50 are each provided with a spur or lug 53 which is adapted to register with the head 54 of a pin 42.

For anchoring the slide bars 47 in idle position when not set, the bars 47 are provided with lugs 55 at the front end of their lower edges to coöperate with the hook portions 56 of the latches 57 pivotally mounted on the shaft 58, the front arms 59 of which latches 57 being connected by springs 60 with the spring abutment plate 61 to normally maintain the hook portions 56 under tension against the slide bars 47.

For anchoring the slide bars 47 in their set position, their lower edges are provided with a plurality of inclined teeth 62 which coöperate with the hook portions 56 and facilitate the movement of the slide bars 47 against the spring tension of the springs 60 when setting the slide bars 47 but prevent restoration of the slide bars 47 until the latches 57 have been actuated so that their hook portions 56 come out of engagement with the slide bars 47. For restoring any of the slide bars 47 individually, the levers 63 fulcrumed on the rod 64 are provided whose rear arms are disposed under the front arms 59 of the latches 57 and whose front arms project through the opening 65 formed in the front of the keyboard 6. By depression of any of the levers 63 the slide bar released thereby will be permitted to be retracted by the spring 77 connected to the lower arm of the lever 48 pivotally connected to the released slide bar 47.

For restoring all of the slide bars 47 simultaneously, a rock plate 66 is provided which is secured to the rock shaft 67 mounted in the frame 11, the rear end of the rock plate 66 being disposed in the recesses 68 formed in the lower portions of the latches 57 and above the hook portions 69 formed by such recesses 68. The universal plate 66 is connected by the extension 70 with a cam link 71 which is provided with an elongated slot 72 through which the shaft 73 extends, on which shaft the cams 74 and 75 are fixed, cam 74 being adapted to engage the roller 76 formed on the end of the cam link 71, the arrangement being such that when the shaft 73 is actuated, the cam 74 will actuate the link 71 to rock the plate 66 and thereby actuate the latches 57 to permit the slide bars 47 to be retracted by the springs 77 connected to the lower arms of the levers 48. The cam 74 for the purpose hereinafter to be described is adapted to actuate the link 71 once for every revolution.

The cam 75 is disposed in engagement with the roller 78 secured to the end of the rod 79 and slidably mounted in the bearing 80 formed in the frame 11, and maintained under tension against the cam 75 by the spring 81, the other end of the rod 79 being pivotally connected to one arm of the bell crank 82 fulcrumed to the frame 11, the other arm being pivotally connected to the link 83 which is pivotally connected to the arm 83' fixed on the shaft 84' on which is fixed the deflector 45 which shaft is mounted in the bearings 84 disposed between the card receptacles 43 and 44, the arrangement being such that with every revolution of the shaft 73, one half of the time, the deflector 45 will be located to deflect cards into the receptacle 43 and the other half of the time located to deflect cards into the receptacle 44.

The shaft 73 is preferably driven by connection with the shaft 19. In the embodiment of Figs. 1 to 6, an arrangement is provided whereby a single card may be perforated with every setting, and thereupon the slide bars restored, or two cards perforated with every setting before the slide bars are restored. To this end two sprocket wheels 85 and 86 are fixed to the shaft 19, the sprocket wheel 85 connected by the sprocket chain 87 with the large sprocket wheel 88 mounted on the shaft 73, the sprocket wheel 86 connected by the sprocket chain 96' with the small sprocket wheel 89 on the shaft 73, the sprocket wheels 88 and 89 being loosely mounted on the shaft 73 and related to one another so that the sprocket wheel 85 will be rotated at the same speed as the sprocket wheel 88 and the sprocket wheel 86 rotated at one half the speed as the sprocket wheel 89. Disposed between the sprocket wheels 85 and 86, and slidably mounted on the shaft 19 but splined thereto to rotate therewith is the clutch member 90 having teeth 91 to engage with the teeth 92 of the sprocket wheel 85 and teeth 93 to engage with the teeth 94 of the sprocket wheel 86. For actuating the clutch member 90, the shift lever 95 is provided by means of which either the sprocket wheel 85 may be clutched with the clutch member 90 to actuate the shaft 73 or else the sprocket wheel 86 so clutched.

From the foregoing it will be seen that after the slide bars 47 have been set for a perforation, and the sprocket wheel 85 is clutched by the clutch member 90, then when the pedal 26 is depressed so that the drive shaft 19 is actuated, a card will be perforated and discharged with every restoration of the slide bars 47 and that, although the deflector 45 will be rocked to and fro with each discharge it will always be positioned to permit discharging of the cards into one and the same receptacle; whereas, when the sprocket wheel 86 is clutched by the clutch member 90, two cards will be perforated and discharged with every restoration of the slide bars 47, and the deflector 45 so rocked that the first card of each set will be deflected into one receptacle and the other card deflected into the other receptacle.

Figure 7:
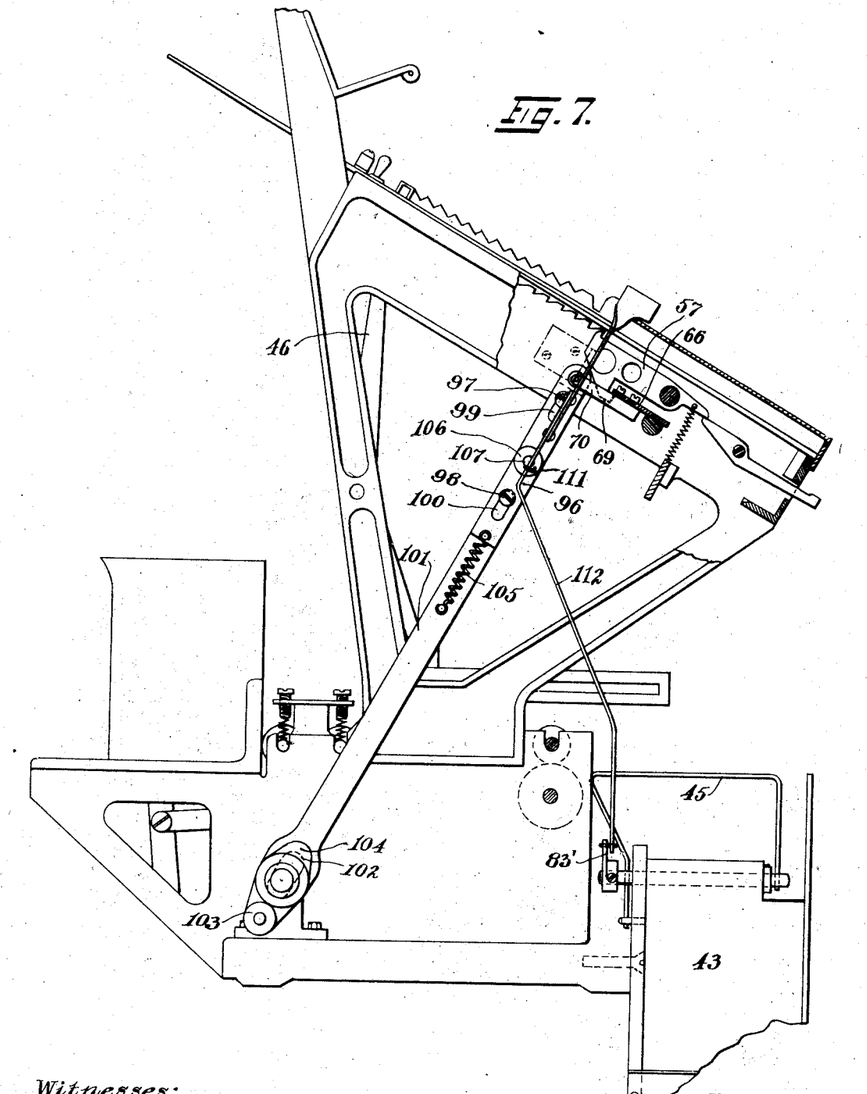
Fig. 7 is an enlarged fragmental side elevation of the upper part of a perforator illustrating another embodiment of the present invention.
Figure 8:
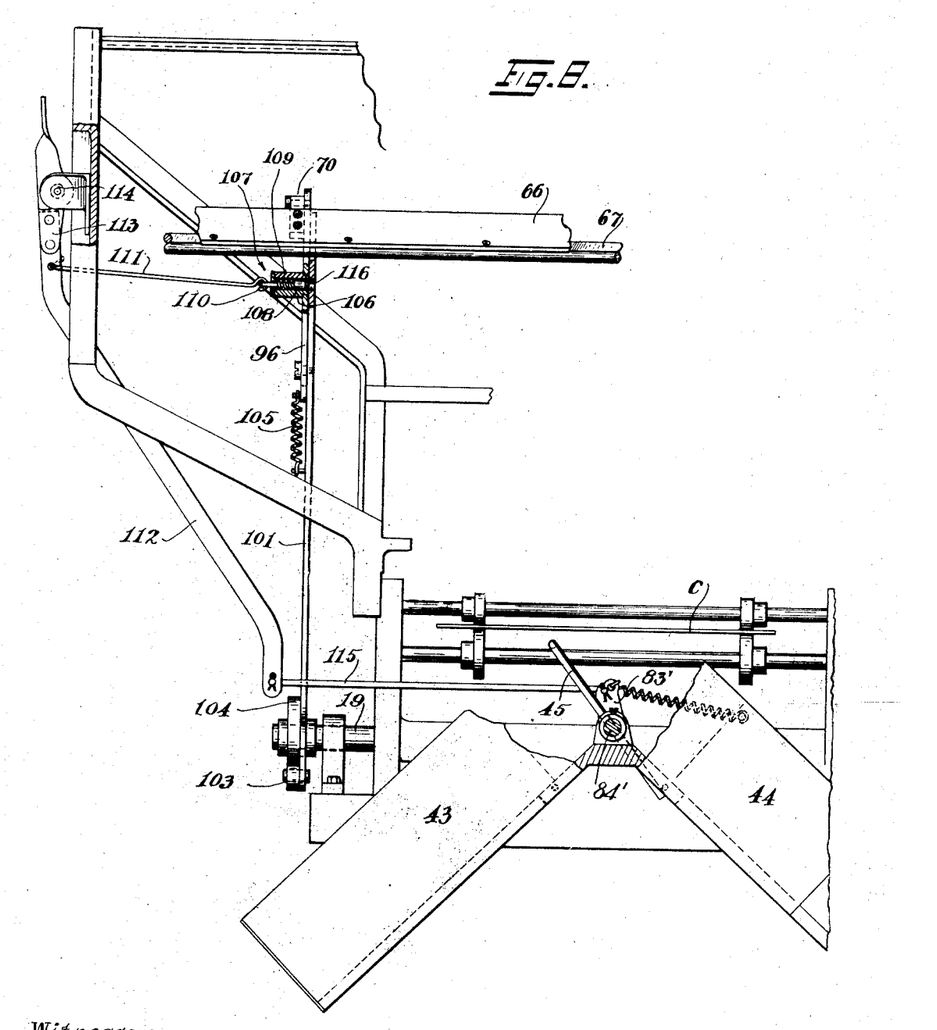
Fig. 8 is an enlarged fragmental front elevation of the upper part of the embodiment illustrated in Fig. 7.

In the embodiment illustrated in Figs. 7 and 8, an arrangement is provided whereby the machine can be set either to reset after each perforation, or else not to reset at all until the operator wishes it. For this purpose, the apparatus is substantially identical to that illustrated in Figs. 1 to 6 except as to the cam link for actuating the universal releasing bar 66 and consequently like parts of the two embodiments will be designated with the same reference characters. In the present embodiment the extension 70 is pivotally connected to a short downwardly extending bar 96 having two slots 99 and 100 through which extend the screws 97 and 98 respectively of the elongated bar 101. The lower end of the elongated bar 101 is provided with an elongated opening 102 through which a shaft 19 extends and a cam roller 103 at its extreme lower end to engage the downwardly extending face of the cam 104 fixed on the shaft 19. The lower end of the bar 96 is connected to the bar 101 by the spring 105. Disposed between the openings 99 and 100, there is provided on the arm 96, a cylindrical bearing 106 in which the pin 107 is mounted, the bore of the bearing 106 registering with an opening formed in the bar 96, the pin being provided with a head 108 which is normally distended through such opening by means of the spring 109 strained between such head and the collar 110 formed in the bearing 106. The outer end of the pin 107 is pivotally connected by the link 111 with the lever 112, the upper end of which is provided with the shifting handle 113 fulcrumed to the bearing 114 secured to the frame 11, and the lower end of which lever 112 is pivotally connected to one end of the rod 115, the other end of which rod is pivotally connected to the arm 83' of the deflector 45, the several parts of the deflector 45 being identical with the construction illustrated in Figs. 1 to 6 and therefore not requiring any further description. For connecting the bar 96 with the bar 101 to permit actuation of the bar 96 simultaneously with the actuation of the bar 101 by the cam 104, an opening 116 is provided in the bar 101 which is adapted to receive the head 108 of the pin 107 when set therefor.

The operation of the aforesaid embodiment is as follows:

When the lever 113 is shifted so that the lever 112 is swung inwardly, the head 108 of the pin 107 is free to enter the opening 116 of the bar 101, and the bar 101 being continually reciprocated, upon the opening 116 registering with the pin 107, the spring 109 will immediately snap the head 108 into the opening 116 whereupon the bar 96 will be reciprocated with the bar 101. Simultaneously with this movement, the deflector 45 will be in its extreme right position where the deflector will remain. In such setting, the universal bar 70 will be actuated with every perforation so that the slide bars 47 will be reset after each perforation and the cards discharged into the receptacle 43. When however it is desired to maintain the same setting for a plurality of perforations it is only necessary to shift the lever 113 so that the pin 107 will be withdrawn from the opening 116 in which position, the bar 96 will be disconnected from the bar 101 and consequently the bar 101 will be reciprocated without affecting the bar 96 or the universal bar 70. Simultaneously with this movement, the deflector 45 will be rocked to discharge the cards into receptacle 44 so long as the device is set to prevent resetting. With this setting, any number of cards may be perforated at the same setting until the operator again shifts the lever 113.

It is obvious that various changes and modifications may be made to the details of construction without departing from the general spirit of the invention.

I claim:

1. In a perforating machine, perforating pins, means for setting said pins for perforation, means for perforating a card by said set pins, means for restoring said setting means, a plurality of means for actuating the said restoring means, one actuating means being timed to actuate said restoring means with every perforation and the other actuating means being timed to actuate said restoring means after a plurality of perforations have been made by the same setting, and means for clutching said actuating means in operation one to the exclusion of the other.

2. In a perforating machine, perforating pins, means for setting said pins for perforation, means for perforating a card by said set pins, means for restoring said setting means, two actuating means for actuating said restoring means, one of said actuating means being timed to actuate said restoring means with every perforation, and the other actuating means being timed to actuate said restoring means after a plurality of perforations have been made by the same setting.

3. In a perforating machine, perforating pins, means for setting such pins for perforations, means for perforating a card by said set pins, means for restoring said setting pins, two actuating means for actuating said restoring means, one of said actuating means being timed to actuate said restoring means with every perforation, and the other actuating means being timed to actuate said restoring means after two perforations have been made by the same setting, and means for clutching said actuating means into operation one to the exclusion of the other.

4. In a perforating machine, perforating pins, means for setting said pins for perforation, means for restoring said setting means, means for perforating a card by said set pins, actuating means for actuating said restoring means after a plurality of perforations have been made by the same setting, means for discharging a card from said machine after having been perforated, a plurality of receptacles into which the cards are discharged, and deflecting means for guiding the several cards perforated by a like setting into different receptacles.

5. In a perforating machine, perforating pins, means for setting such pins for perforation, means for restoring said setting means, means for perforating a card by said set pins, and actuating means for actuating said restoring means after a plurality of perforations have been made by the same setting.

6. In a perforating machine, a pin box having plates between which cards to be perforated are fed, perforating pins mounted in one of said plates, means for raising said pin box for perforation, means for obstructing the ascent of such pins as are to perforate, means for normally maintaining said obstructing means in inoperative position, means for anchoring said obstructing means in position when set for perforation, means for releasing said anchoring means to permit the restoration of such obstructing means, a plurality of means for actuating said restoring means, one actuating means being timed to actuate said restoring means with every perforation, and the other actuating means being timed to actuate said restoring means after a plurality of perforations have been made by the same setting.

7. In a perforating machine, a pin box having plates between which cards to be perforated are fed, perforating pins mounted in one of said plates, means for raising said pin box for perforation, means for obstructing the ascent of such pins as are to perforate, means for normally maintaining said obstructing means in inoperative position, means for anchoring said obstructing means in position when set for perforation, means for releasing said anchoring means to permit the restoration of such obstructing means, a plurality of means for actuating said restoring means, one actuating means being timed to actuate said restoring means with every perforation, and the other actuating means being timed to actuate said restoring means after a plurality of perforations have been made by the same setting, and means for clutching said anchoring means in operation one to the exclusion of the other.

8. In a perforating machine, a pin box having plates between which cards to be perforated are fed, perforating pins mounted in one of said plates, means for raising said pin box for perforation, means for obstructing the ascent of such pins as are to perforate, means for normally maintaining said obstructing means in inoperative position, means for anchoring said obstructing means in position when set for perforation, means for releasing said anchoring means to permit the restoration of said obstructing means, and means for actuating said restoring means after a plurality of perforations have been made by the same setting.

9. In a perforating machine, perforating pins, means for setting said pins for perforation, means for perforating a card by said set pins, means for anchoring said setting means in position when set for perforation, means for releasing said anchoring means to permit the restoration of said setting means, and actuating means for actuating said releasing means after a plurality of perforations have been made by the same setting.

10. In a perforating machine, perforating pins, means for setting said pins for perforation, means for perforating a card by said set pins, and means for discharging a card after perforation, means for anchoring said setting means in position when set for perforation, means for releasing said anchoring means to permit the restoration of said setting means, and actuating means for actuating said releasing means after a plurality of perforations have been made by the same setting.

11. In a perforating machine, perforating pins, means for setting said pins for perforation, means for perforating a card by said set pins, means for anchoring said setting means in position when set for perforation, driving means, a drive shaft, means for connecting said drive shaft with said driving means, means for actuating said perforating means mounted on said drive shaft and timed to operate once with every revolution of said drive shaft, and means for actuating said releasing means connected to said drive shaft and timed to operate once with every two revolutions of said drive shaft.

12. In a perforating machine, perforating pins, means for setting said pins for perforation, means for anchoring said setting means in position when set for perforation, means for perforating a card by said set pins, means for discharging a card after perforation, two receptacles adjacent to one another to receive the cards discharged from said machine, a deflector for alternatively deflecting cards into said receptacle, a drive shaft, means for actuating said perforating means mounted on said drive shaft and timed to operate once with every revolution of said drive shaft, means for actuating said releasing means connected to said drive shaft and timed to operate once with every two revolutions of said drive shaft so that two cards will be successively perforated by the same setting, and means for actuating said deflector connected to said drive shaft and timed to rock said deflector to and fro for every two revolutions of said drive shaft so that said deflector will be positioned to deflect the first card perforated by a single setting into one receptacle and to deflect the second card perforated by the same setting into the other receptacle.

13. In a perforating machine, perforating pins, means for setting said pins for perforation, means for perforating a card by said setting pins, means for anchoring said setting means in position when set for perforation, driving means, a drive shaft, means for connecting said drive shaft with said driving means, a pedal for actuating said connecting means, means for actuating said driving means mounted on said drive shaft and timed to operate once with every revolution of said drive shaft, and means for actuating said releasing means connected to said drive shaft and timed to operate once with every two revolutions of said drive shaft.

14. In a perforating machine, perforating pins, means for setting said pins for perforation, means for anchoring said setting means in position when set for perforation, means for perforating a card by said set pins, means for discharging a card after perforation, two receptacles adjacent to one another to receive the cards discharged from said machine, a deflector for alternatively deflecting cards into said receptacles, a drive shaft, means for actuating said perforating means mounted on said drive shaft and timed to operate once with every revolution of said drive shaft, means for actuating said releasing means and timed to operate once with every two revolutions of said drive shaft so that two cards will be successively perforated by the same setting, means for actuating said releasing means and timed to operate once with every revolution of said drive shaft so that but one card will be perforated by a single setting, and clutching means for actuating either of said actuating means into operation one to the exclusion of the other.

15. In a perforating machine, perforating pins, means for setting said pins for perforation, means for perforating a card by said set pins, means for anchoring said setting means in position when set for perforation, a drive shaft, means for actuating said driving means mounted on said drive shaft and timed to operate once with every revolution of said drive shaft, a second shaft, a cam on said second shaft, a cam link connecting said cam with said anchoring means operating to release the same, and connecting means for connecting said second shaft with said drive shaft to operate once with every two revolutions of said drive shaft.

16. In a perforating machine, perforating pins, means for setting said pins for perforation, means for anchoring said setting means in position when set for perforation, means for perforating a card by said set pins, means for discharging a card after perforation, two receptacles adjacent to one another to receive the cards discharged from said machine, a deflector for alternatively deflecting cards into said receptacles, a drive shaft, means for actuating said perforating means mounted on said drive shaft and timed to operate once with every revolution of said drive shaft, a second shaft, a cam on said second shaft, a cam link connecting said cam with said anchoring means operating to release the same, a second cam on said second shaft, a spring-pressed rod engaging said second cam, a deflector shaft on which said deflector is pivotally mounted, a link pivotally connected to said deflector, a bell crank pivotally connected to said link, and connected to said spring-pressed rod so that the actuation of said rod by said second cam will rock said deflector, and connecting means for connecting said second shaft with said drive shaft to operate once with every two revolutions of said drive shaft.

17. In a perforating machine, perforating pins, means for setting said pins for perforation, means for anchoring said setting means in position when set for perforation, means for perforating a card by said set pins, means for discharging a card after perforation, two receptacles adjacent to one another to receive the cards discharged from said machine, a deflector for alternately deflecting cards into said receptacles, a drive shaft, means for actuating said perforating means mounted on said drive shaft and timed to operate once with every two revolutions of said drive shaft, a second shaft, a cam on said second shaft, a cam link connecting said cam with said anchoring means operating to release the same, a second cam on said second shaft, a spring-pressed rod engaging said second cam, said second cam having a low spot for half its periphery and a high spot for the other half so that the said rod will assume two positions with every revolution of said second cam, a deflector shaft on which said deflector is pivotally mounted, a link pivotally connected to said deflector, a bell crank pivotally connected to said link, and connected to said spring-pressed rod so that the actuation of said rod by said second cam will rock said deflector, and connecting means for connecting said second shaft with said drive shaft to operate once with every two revolutions of said drive shaft.

18. In a perforating machine, perforating pins, means for setting said pins for perforation, means for perforating a card by said set pins, means for restoring said setting means after each perforation, and means for anchoring said restoring means against actuation to permit the repeating of actuation of said perforating means by the same setting.

19. In a perforating machine, perforating pins, means for setting said pins for perforation, means for perforating a card by said set pins, means for restoring said setting means after each perforation, and means for anchoring said restoring means against actuation to permit the actuation of said perforating means at the same setting any number of times.

20. In a perforating machine, perforating pins, means for setting said pins for perforation, means for perforating a card by said set pins, means for restoring said setting means after each perforation, means for anchoring said restoring means against actuation to permit the actuation of said perforating means at the same setting any number of times, means for discharging a card from said machine after having been perforated, a plurality of receptacles into which the cards are discharged, and deflecting means connected to said anchoring means to be set to deflect the cards into one receptacle when resetting takes place after each perforation or else to be set to deflect the cards into another receptacle when the resetting means are anchored against actuation.

21. In a perforating machine, a pin box having plates between which cards to be perforated are fed, perforating pins mounted in one of said plates, means for raising said pin box for perforation, means for obstructing the ascent of such pins as are to perforate, means for normally maintaining said obstructing means in inoperative position, means for anchoring said obstructing means in position when set for perforation, means for releasing said anchoring means to permit the restoration of said obstructing means after a perforation, and means for anchoring said releasing means so that a plurality of perforations may be made by the same setting.

22. In a perforating machine, perforating pins, means for setting said pins for perforation, means for anchoring said setting means in position when set for perforation, means for perforating a card by said setting means, means for discharging a card after perforation, two receptacles adjacent and inclined to one another and disposed at the discharge end of said machine, a rock shaft extending between said receptacles, a deflector for alternatively deflecting cards into said receptacle mounted on said rock shaft, a drive shaft, means for actuating said perforating means mounted on said drive shaft and timed to operate once with every revolution of said drive shaft, a second shaft, a cam on said second shaft, a cam link connecting said cam with said connecting means and operating to release the same, a second cam on said shaft, a spring-pressed rod engaging said second cam, a link pivotally connected to said deflector, a bell crank pivotally connected to said link and connected to said spring-pressed rod so that the actuation of said rod by second cam will rock said deflector, and connecting means for connecting said second shaft with said drive shaft to operate once for every two revolutions of said drive shaft.

JAMES POWERS.

Witnesses:
GUSTAV DREWS,
FRANK FAGGRAIN.